United States Patent [19]
Yakubovich et al.

[11] Patent Number: 4,476,388
[45] Date of Patent: Oct. 9, 1984

[54] RADIOMETRIC METHOD FOR DETERMINING CONCENTRATION OF NATURALLY OCCURRING ISOTOPES AND DEVICE THEREFOR

[75] Inventors: Solomon L. Yakubovich; Marat E. Kotsen; Vladislav V. Golubnichy, all of Moscow; Voldemar E. Gerling; Jury N. Stepanov, both of Leningrad, all of U.S.S.R.

[73] Assignee: Vsesojuzny Nauchnoissledovatelsky Institut Miniralnogo Syria, Moscow, U.S.S.R.

[21] Appl. No.: 341,750

[22] Filed: Jan. 22, 1982

[51] Int. Cl.³ .............................................. G01T 1/20
[52] U.S. Cl. ................................ 250/361 R; 250/366
[58] Field of Search .................... 250/328, 361 R, 366, 250/367, 369

[56] References Cited

U.S. PATENT DOCUMENTS

| | | | |
|---|---|---|---|
| 3,114,835 | 12/1963 | Packard | 250/366 |
| 3,767,915 | 10/1973 | Battist | 250/366 |
| 3,914,602 | 10/1975 | Goldstein | 250/367 |
| 4,298,796 | 11/1981 | Warner et al. | 250/361 R |

Primary Examiner—Janice A. Howell
Attorney, Agent, or Firm—Lilling & Greenspan

[57] ABSTRACT

The proposed method essentially consists in that a sample of a substance is placed between two scintillators in immediate contact therewith whereupon said sample is hermetically sealed. Arranged in close proximity to each scintillator is a photomultiplier tube recording ionizing $\alpha$- and $\beta$-radiation. A selector is utilized to select pulses corresponding to $\alpha$- and $\beta$-particles, and delayed coincidence circuits of a recording element separate and record $\beta$-$\alpha$ and $\alpha$-$\alpha$ cascade pairs of delayed coincidences of RaC, ThC, and AcA radionuclides. Flows are measured twice at a predetermined time interval to account for emanation build-up tendency and concentration of isotopes of radium is determined from the formula $$q_{Ra}^A = \frac{1}{\epsilon_A} \cdot \left[ \Phi_1 + \frac{\Phi_2 - \Phi_1}{1 - e^{-\lambda_A T}} \right],$$

where
$q_{Ra}^A$ = concentration of a given isotope of radium;
$\epsilon_A$ = isotope-of-radium concentration unit sensitivity of measuring equipment;
$\Phi_1$, $\Phi_2$ = number of pulses corresponding to cascade pairs for a given radionuclide measured immediately after sealing and after a preset time interval thereafter;
$\lambda_A$ = decay constant for radionuclide emanation;
T = preset time interval equal to emanation build-up time.

2 Claims, 2 Drawing Figures

RADIOMETRIC METHOD FOR DETERMINING CONCENTRATION OF NATURALLY OCCURRING ISOTOPES AND DEVICE THEREFOR

BACKGROUND OF THE INVENTION

1. Field of the Invention

The present invention relates to nuclear radiation measurements by the use of scintillation detectors and in particular to a radiometric method for determining concentration of naturally occurring isotopes of radium and a device therefor.

The present invention may be used in radiogeochemical prospecting and exploration of mineral resources. The invention may also be used to effect radiation monitoring and ecological investigation of an environment in exploiting radioactive deposits, at processing plants and at nuclear power stations, primarily for measuring a natural radionuclide background in industrial areas and discharges of radioactive elements into the atmosphere, as well as water pollution. The invention is suitable for measuring concentration of radionuclides in construction materials in utilizing mining-industry waste. It may be advantageously used in solving various meteorological problems, say, for determining the age and origin of an air mass in Rn and ThB tests, as well as in health resorts (for radon and emanation treatment), another possible application of the invention being measurements of radionuclide concentration in dry products.

2. Prior Art

A widely known prior art method for determining concentration of naturally occurring isotopes of radium in samples (cf. M. Curie "Radioactivity", State Phys. Math. publishing house, Moscow, 1960, pp. 157–162) comprises the steps of full chemical decomposition of a sample of an analyzed substance, separation of isotopes of radium from the solution, re-solution of radium, sealing of the solution in a bubbler to build up emanation over a predetermined time interval equal to an emanation build-up time, transfer of emanation into a measuring chamber, and a subsequent measurement of gas $\alpha$-radiation activity. Losses due to radium absorption on walls of glass flasks lead to appreciable systematic errors in measurements, a disadvantage substantially limiting the use of the aforesaid method. Moreover, the foregoing method has been generally unsatisfactory due to a comparatively long analysis time. (It takes at least 7-9 days to obtain final results after the analysis is started). The sample of material is chemically decomposed whereby the analysis may not be repeated.

Also known in the art is a radiometric method of determining $\gamma$-radiation concentration of isotopes of radium (cf. E. I. Zheleznov, I. P. Shumilin and B. Ya. Yufa "Radiometric Methods of Analyzing Natural Radioactive Elements", Nedra, Moscow, 1968, pp. 197–200, in Russian), which comprises the steps of placing a sample into a hermetically sealed container, emanation build-up at a preset time interval, and a subsequent $\gamma$-spectrometric measurement by the use of a NaI (Tl) radon decay product $\gamma$-radiation scintillation crystal.

The aforesaid method does not provide a desired measuring accuracy in the case of a high thorium concentration, particularly with an upset radioactive equilibrium in a $^{232}$Th-MsTh series, and also when a potassium concentration is high ($^{40}$K due to $\gamma$-radiation). To account for non-radium radiator $\gamma$-radiation contribution, it is necessary to additionally analyze the sample by the X-ray spectral method (U and Th) and by the flame photometric method (K). Such a method does not permit determining isotopes of radium for low-mass samples (less than 30 g).

Also known in the art is a radiometric method of determining naturally occurring isotopes of radium (cf. A. L. Yakubovich, M. Ye. Kotsen "Selective Analysis of Radionuclides by the Delayed Coincidence Method", Journal of Radioanalytical Chemistry, Vol. 57, No. 2, 1980, pp. 461–472) which comprises the steps of placing a sample into an open dish, and positioning the dish with the sample allowing a small air gap under a combination scintillator (polystyrene with p-terphenyl and 1.4-bis-5 phenyloxazolyl-benzol, and ZnS (Ag) simultaneously recording $\beta$- and $\alpha$-radiation of the samples and $\beta$-$\alpha$ delayed coincidences of radon and thoron decay products (radionuclides of the radium and ThX family). With the aforesaid method, samples should be measured in layers of a different thickness (in three dishes varying as to depth) to determine an emanation loss factor which must be accounted for in measuring radium concentration. However, this factor may be determined to a low accuracy due to the fact that emanation separation is affected by atmospheric pressure variations, air temperature fluctuations, and a moisture content of samples. The foregoing method does not allow measurements of low-mass samples (less than 15 g) due to the fact that each sample has to be placed in three dishes varying as to depth. The measurement results are appreciably affected by the radioactive equilibrium in the Th-MsTh-ThB series and the $^{238}$U-$^{234}$U-10 series since these radionuclides are $\alpha$-radiators and the emanation loss factor is computed by solving a balance equation in equilibrium systems of natural radioactive families with $\alpha$-radiation.

A device for executing the aforesaid method (A. L. Yakubovich, M. Ye. Kotsen "Selective Analysis of Radionuclides by the Delayed Coincidence Method", Journal of Radioanalytical Chemistry, Vol. 57, No. 2, 1980, pp. 461–472) represents a beta-alpha radiometer. The device comprises a combination scintillator disposed in close proximity to a sample of an analyzed substance, and a sample feed mechanism, into which three dishes containing the sample are successively installed, said dishes being open at the top. A photomultiplier tube recording scintillation is connected to an electronic selector separating pulses corresponding to $\beta$- and $\alpha$-particles and $\beta$-$\alpha$ cascade pairs of delayed coincidences of RaC and ThC radionuclides, said selector being connected to a recording element.

The known device does not allow measurements of hermetically sealed samples due to low sensitivity associated with $2\pi$ measuring geometry. Such a device does not permit radium concentration measurements in a sample wherein radium concentration is less than $10^{-10}\%$ of a radium mass fraction.

SUMMARY OF THE INVENTION

It is an object of the invention to exclude the effect of emanation losses in a sample upon results obtained in determining radium concentration and to enhance effectiveness in recording $\beta$-$\alpha$ and $\alpha$-$\alpha$ cascade pairs of delayed coincidences of AcA, RaC and ThC radionuclides.

The invention resides in that in a radiometric method for determining concentration of naturally occurring isotopes of radium in samples comprising the steps of recording by the use scintillation ionizing α- and β-radiation and β-α and α-α delayed coincidences of cascade pairs of RaC, ThC and AcA radionuclides, and measuring flows of α- and β-particles and β-α and α-α cascade pairs of delayed coincidences of RaC, ThC and AcA radionuclides, according to the invention, a sample of an analyzed substance is brought into immediate contact with a scintillator, said sample being simultaneously sealed, and measuring twice flows of α- and β-particles and β-α and α-α cascade pairs of delayed coincidences of RaC, ThC and AcA radionuclides over a predetermined time interval, the measurement results being used to determine concentration of naturally occurring isotopes of radium in a sample from the formula $$q_{Ra}^A = \frac{1}{\epsilon_A} \cdot \left[ \Phi_1 + \frac{\Phi_2 - \Phi_1}{1 - e^{-\lambda_A T}} \right], \quad (1)$$

where
$q_{Ra}^A$ = concentration of a given isotope of radium (A=226 or 224 or 223), % of a mass fraction;
$\epsilon_A$ = isotope-of-radium concentration unit sensitivity (A=226 or 224 or 223), pulses per second referred to 1% of a mass fraction of a respective isotope;
$\Phi_1$ = number of pulses corresponding to β-α and α-α cascade pairs for a respective radionuclide measured immediately after the sample is hermetically sealed;
$\Phi_2$ = number of pulses corresponding to β-α and α-α cascade pairs for a respective radionuclide measured after a preset time interval following the sealing of the sample;
$\lambda_A$ = emanation decay constant for a respective radionuclide:
for $^{226}$Ra the constant is $^{222}$Rn=2.097·10$^{-6}$ s$^{-1}$;
for $^{224}$Ra the constant ThB=1.809·10$^{-5}$ s$^{-1}$;
for $^{223}$Ra the constant $^{219}$An=0.1768 s$^{-1}$; and
T = preset time interval equal to emanation build-up time.

The invention also resides in that in a device for determining concentration of naturally occurring radium isotopes in samples comprising a combination scintillator arranged in close proximity to a sample of an analyzed substance and provided with a scintillation recording photo-multiplier tube, a selector electrically coupled thereto and used to separate pulses corresponding to α-β particles and β-α and α-α cascade pairs of delayed coincidences of RaC, ThC and AcA radionuclides, and an element for recording pulses corresponding to α- and β-particles and β-α and α-α cascade pairs of delayed coincidences of RaC, ThC and AcA radionuclides, according to the invention, provision is made for an additional combination scintillator disposed in close proximity to the first scintillator so that the sample of the analyzed substance is arranged therebetween and is in contact therewith, said additional combination oscillator having an individual photomultiplier tube connected together with the photomultiplier tube of the first scintillator to an adder having its output coupled to the selector.

The invention permits simultaneous measurements of concentration of all three naturally occurring isotopes: $^{226}$Ra, $^{224}$Ra, and $^{223}$Ra another advantage being high efficiency in analyzing a sample with natural emanation loss.

BRIEF DESCRIPTION OF THE DRAWINGS

The invention will now be described further with reference to a specific embodiment thereof, taken in conjunction with the accompanying drawings, wherein.

DESCRIPTION OF THE PREFERRED EMBODIMENT

Figure 1:
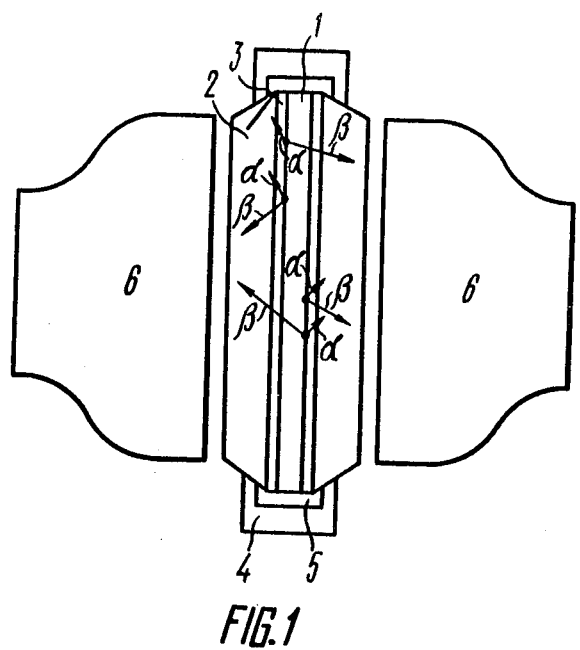
FIG. 1 shows structure of combination scintillators according to the invention.

The hereinproposed method for determining concentration of naturally occurring isotopes of radium in samples essentially consists in the following. A sample of an analyzed substance, say, powder, water or an aerosol filter is placed into a scintillation container whereupon said container is hermetically sealed. The flows of α- and β-particles and β-α and α-α cascade pairs of delayed coincidences of RaC, ThC and AcA radionuclides are measured immediately after the sealing operation. Then the flows of α- and β-particles and β-α and α-α cascade pairs of delayed coincidences of RaC, ThC and AcA radionuclides are repeatedly measured in a similar manner after a preset time interval equal to Rn, Tn and An emanation build-up time.

The emanation build-up time is determined with due account for possible emanation losses in samples. Emanation losses normally amount to 10–15% in samples of rock and soil.

In some instances this figure may be as great as 30–50%, say, in samples of coal and ocher. Full equilibrium may be attained within 25 days in the $^{226}$Ra-Rn-RaC series, within 3 days in the $^{224}$Ra-Th-ThB-ThC series, and within an hour in the $^{223}$Ra-An-AcA series.

A second measurement is performed in 2 to 5 days. During this step, tendency to emanation build-up is taken into account, and concentration of isotopes of radium is computed from the formula $$q_{Ra}^A = \frac{1}{\epsilon_A} \cdot \left[ \Phi + \frac{\Phi_2 - \Phi_1}{1 - e^{-\lambda_A T}} \right], \quad (2)$$

where
$q_{Ra}^A$ = concentration of a given isotope of radium (A=226 or 224 or 223), % of a mass fraction;
$\epsilon_A$ = isotope-of-radium concentration unit sensitivity of measuring equipment (A=226 or 224 or 223), pulses per second referred to 1% of a mass fraction of a respective isotope;
$\Phi_1$ = number of pulses corresponding to β-α and α-α cascade pairs for a respective radionuclide measured immediately after the sample is hermetically sealed;
$\Phi_2$ = number of pulses corresponding to β-α and α-α cascade pairs for a respective radionuclide measured after a preset time interval after the sample is sealed;
$\lambda_A$ = emanation decay constant of a respective radionuclide:
for $^{226}$Ra the constant $^{222}$Rn=2.097·10$^{-6}$ s$^{-1}$;
for $^{224}$Ra the constant ThB=1.809·10$^{-5}$ s$^{-1}$;
for $^{223}$Ra the constant $^{219}$An=0.1768 s$^{-1}$;

T = preset time interval equal to emanation build-up time.

Given below is an example illustrating the method forming the subject of the present invention.

EXAMPLE 5 g of an analyzed powder sample of alaskite granites ground to a grain size of 75 μm is poured on a disk surface of a combination scintillator, levelled, and closed with another combination scintillator. Thereafter the sample and the scintillators are hermetically sealed by the use of a metal casing. The container holding the sample is installed between two photomultiplier tubes. During a time period $t=3.10^3$ s, scintillations are used to record the flows of α- and β-particles and $\beta\text{-}\alpha$ and α-α cascade pairs of delayed coincidences of RaC, ThC and AcA radionuclides.

Said flows are repeatedly measured after two days. The measurement results are given in Table 1.

TABLE 1

| Measured isotope | t | $\Phi_1 \cdot t$ | $\Phi_2 \cdot t$ | $\left(\Phi_1 + \dfrac{\Phi_2 - \Phi_1}{1 - e^{-\lambda_A T}}\right) t$ |
|---|---|---|---|---|
| (β−α)RaC | $3 \cdot 10^3$ | 296 | 310 | 356 |
| (β−α)ThC | $3 \cdot 10^3$ | 139 | 142 | 145 |
| (β−α)AcA | $3 \cdot 10^3$ | 5 | 5 | 5 |

The data obtained are corrected to account for actual emanation build-up time and equipment sensitivity whose values for isotopes of radium are given in Table 2.

TABLE 2

| Measured isotope | Equipment sensitivity (number of pulses per second referred to 1% of isotope mass fraction)$\epsilon_A$ |
|---|---|
| $^{226}Ra$ | $5.56 \cdot 10^7$ |
| $^{224}Ra$ | $5.79 \cdot 10^{12}$ |
| $^{223}Ra$ | $1.64 \cdot 10^{12}$ |

Table 3 lists the values of concentration of isotopes of radium $^{226}Ra$, $^{224}Ra$, and $^{223}Ra$ in a sample of granite.

TABLE 3

| Measured isotope | Concentration of isotope of radium, % of mass fraction | Concentration of equiponderant parent radionuclides % of mass fraction |
|---|---|---|
| $^{226}Ra$ | $2.13 \cdot 10^{-9}$ | 0.0063 ($^{238}U$) |
| $^{224}Ra$ | $1.92 \cdot 10^{-15}$ | $4.54 \cdot 10^{-5}$ ($^{235}U$) |
| $^{223}Ra$ | $8.33 \cdot 10^{-15}$ | 0.0120 ($^{232}Th$) |

Thus, the method forming the subject of the present invention permits simultaneous measurements of all three naturally occurring isotopes of radium ($^{226}Ra$, $^{224}Ra$, and $^{223}Ra$), another advantage being high efficiency in analyzing samples with natural emanation loss. Placement of a sample between two combination scintillators without air gaps makes measurement results essentially unaffected by decay products of $^{224}Ra$, $^{223}Ra$, actinon and toron, which are accumulated within an air gap. Thus, three isotopes of radium may be analyzed simultaneously only when a sample of an explored substance is in immediate contact with a scintillator.

Sealing the sample immediately after pouring makes it possible to perform a first measurement 0.5 to 2 h after the sample is prepared, while a second measurement required to account for radon build-up tendency may be made within 2 days.

Computing concentration of a measured isotope of radium with due account for emanation build-up tendency provides high accuracy in determining concentration of isotopes of radium, another positive feature being high efficiency in performing an analysis.

A device for determining concentration of naturally occurring isotopes of radium in a sample 1 (FIG. 1) comprises two combination scintillators disposed in the immediate vicinity with respect to each other, the sample 1 of an analyzed substance, say, powder weighing 5 g being poured between said scintillators. Each combination scintillator includes a 120-mm dia. disk 2 fabricated from a scintillation plastic with zinc sulphide powder pressed in a boundary layer 3 and activated with silver. As a result of pressing, there is produced, a smooth, washable surface poorly sorbing short-lived emanation decay products.

The α- and β-particles from the surface layer of the sample 1 cause scintillation bursts, respectively, in the ZnS (Ag) and polystyrene layers, the bursts being greatly different as to scintillation glow. The measurement geometry for the α-particles correspond to $2\pi$ and approximates $4\pi$ for the β-particles due to a small thickness of the sample 1 (0.05 g/cm$^2$). The scintillators with the sample 1 are hermetically sealed by the use of a casing 4 with gaskets 5. To record light flashes in the scintillators, the device is provided with two photomultiplier tubes 6 arranged so that their photocathodes face the scintillators.

Figure 2:
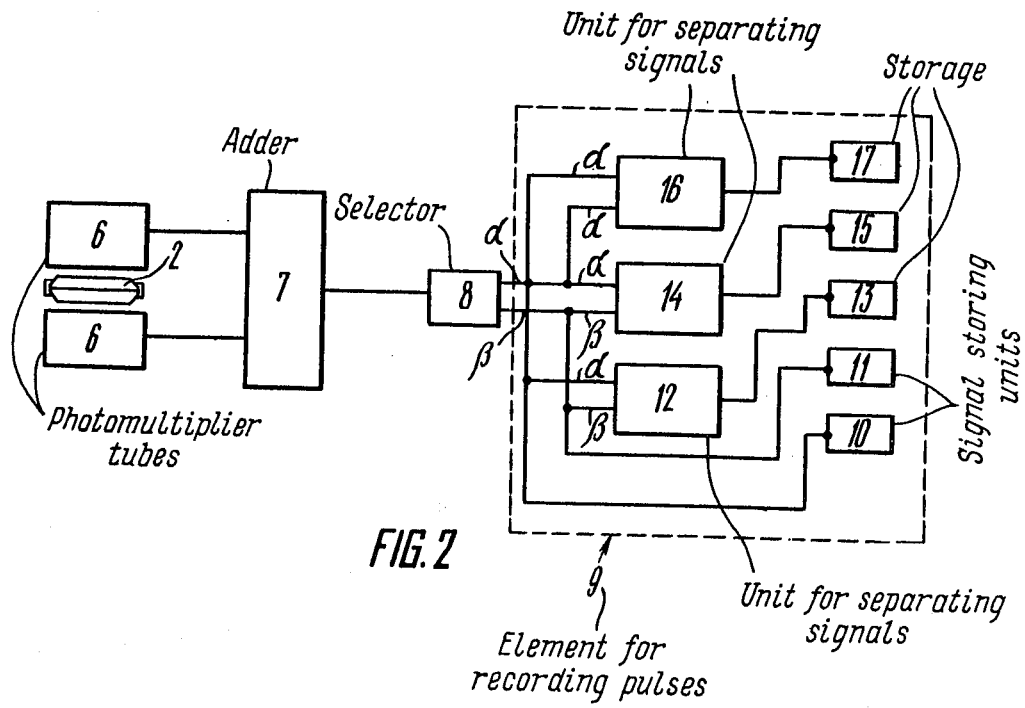
FIG. 2 is a block diagram of a device for implementing the proposed method for determining concentration of naturally occurring isotopes of radium in samples according to the invention.

The outputs of the two photomultiplier tubes 6 (FIG. 2) are connected to an adder 7. The output of the adder 7 is connected to a selector 8, which is a pulse height discriminator. The α and β outputs of the selector 8 are connected to an element 9 for recording pulses corresponding to the α- and β-particles and the β-α and α-α cascade pairs of delayed coincidences of RaC, ThC and AcA radionuclides. The recording element 9 includes two units 10 and 11 used to store signals corresponding to the number of α- and β-particles, the inputs of said units being connected, respectively, to the α and β outputs of the selector 8. The recording element 9 also includes a unit 12 for separating signals corresponding to the β-α cascade pairs of delayed coincidences of an RaC radionuclide, a storage 13 being connected to said unit, a unit 14 for separating signals corresponding to the β-α cascade pairs of delayed coincidences of a ThC radionuclide, a storage 15 being connected to said unit, and a unit 16 for separating signals corresponding to the α-α cascade pairs of delayed coincidences of an AcA radionuclide, a storage 17 being connected to said unit. The inputs of the units 12, 14, and 16 are connected to the outputs of the selector 8, respectively.

The hereinproposed device for determining concentration of naturally occurring isotopes of radium in samples operates as follows. The sample 1 (FIG. 1) of an analyzed substance is placed between the two combination scintillators, hermetically sealed by means of the casing 4, and arranged between the two photomultiplier tubes 6. The α- and β-particles from the surface of the sample 1 get into the scintillator and cause light flashes of different duration. The duration of light flashes caused by the β-particles in polystyrene is about 60 ns, while the duration of light flashes caused by the α-particles in zinc sulphide (ZnS) is about 4 μs. In the photomultiplier tubes 6 the light flashes are converted into electrical signals whose duration corresponds to the duration of the light flashes, while spacing between the pulses corresponds to time distribution of light flashes. From the outputs of the tubes (FIG. 2) current pulses are fed to the inputs of the adder 7 which combines the output signals of the tubes 6 into a common time sequence without any relative time shift. From the output of the adder 7 the pulses are fed to the selector 8 which separates them in duration. Pulses shorter than 100 ns are applied to the β output of the selector 8, while longer pulses are fed to the α output. The pulses derived from the α output of the selector 8 are applied to the input of the unit 10 storing signals corresponding to the number of α-particles during measurements, and simultaneously to the respective inputs of the units 12, 14, and 16. The pulses derived from the β output of the selector 8 come to the input of the unit 14 storing signals corresponding to the number of β-particles during measurements, and simultaneously to the respective inputs of the unit 12, 14, 16.

The pulse corresponding to the β-particle and coming to the input of the unit 12 triggers a delayed coincidence circuit whose window is 600 microseconds and a time delay is 10 microseconds. A window of 600 μs is set with due account for the half-life of a RaC radionuclide equal to 164 μs (about 4T₁). The pulse corresponding to the α-particle is recorded by the unit 13 only if it comes to the input of the delayed coincidence circuit within 600 μs after arrival of the β-particle. The pulse corresponding to the β-particle and coming to the input of the unit 14 triggers the delayed coincidence circuit with a window of 1.5 μs and a time delay of 50 ns. A window of 1.5 μs is set with due account for the half-life of a ThC radionuclide, which is equal to 0.3 μs. The pulse corresponding to the α-particle is recorded by the unit 15 only if it comes to the input of the delayed coincidence circuit within 1.5 μs after arrival of the β-particle.

The pulse corresponding to the α-particle and coming to the input of the unit 16 triggers the delayed coincidence circuit with a time delay of 200 μs and a window of 6 ms. A window of 6 ms is set with due account for the half-life of an AcA radionuclide, which is equal to 1.83 ms.

The storage 17 stores the next pulse corresponding to the α-particle if it comes to the input of the unit 16 within a time interval equal to the circuit window.

The chosen delay of the delayed coincidence circuits of the units 12, 14, and 16 permits recording, respectively, in the units 13, 15, 17 the cascade pairs of delayed coincidences of only one radionuclide (the RaC radionuclide pair in the unit 13, the ThC radionuclide pair in the unit 15, and the AcA radionuclide pair in the unit 17).

Thus, placing the sample 1 (FIG. 1) of an analyzed substance between two combination scintillators so as to provide contact therebetween enhances effectiveness in recording (β-α) cascade pairs of delayed coincidences of RaC, ThC and AcA radionuclides due to improved β-particle measurement geometry, the layer of the sample 1 being so thin that absorption of the β-particles therein is negligible.

What is claimed is:

1. A radiometric method for determining concentration of naturally occurring isotopes of radium in a sample of an analyzed substance comprising the following successive steps:

placing the sample of the analyzed substance between two scintillators separated by a screen and in contact therewith, and simultaneously sealing said sample;

recording by the use of light flashes occurring in said scintillator ionizing α- and β-radiation and β-α and α-α cascade pairs of delayed coincidences of RaC, ThC and AcA radionuclides;

measuring twice flows of α- and β-particles and β-α and α-α delayed coincidences of cascade pairs of RaC, ThC and AcA radionuclides after a preset time interval;

determining concentration of naturally occurring isotopes of radium in said sample of said analyzed substance using the obtained results by the formula:

$$q_{Ra}^{A} = \frac{1}{\epsilon_A} \cdot \left[ \Phi_1 + \frac{\Phi_2 - \Phi_1}{1 - e^{-\lambda_A T}} \right]$$

where $q_{Ra}^{A}$ = concentration of a measured isotope of radium (A=226 or 224 or 223), % of a mass fraction;

$\epsilon_A$ = isotope-of-radium concentration unit sensitivity of measuring equipment (A=226 or 224 or 223), pulses per second referred to 1% of a mass fraction of a respective isotope;

$\Phi_1$ = number of pulses corresponding to β-α and α-α cascade pairs for a respective radionuclide, which is measured immediately after said sample is sealed;

$\Phi_2$ = number of pulses corresponding to β-α and α-α cascade pairs for a respective radionuclide, which is measured after a preset time interval following the sealing of said sample;

$\lambda_A$ = emanation decay constant of a respective radionuclide for:

$^{226}$Ra the constant $^{222}$Rn=2.097×10$^{-6}$ s$^{-1}$;
$^{224}$Ra the constant ThB=1.809×10$^{-5}$ s$^{-1}$;
$^{223}$Ra the constant $^{219}$An=0.1768 s$^{-1}$;

T = said preset time interval equal to emanation build-up time.

2. A device for determining concentration of naturally occurring isotopes of radium in a sample of an analyzed substance comprising:

a first scintillator with a photomultiplier tube;

a second scintillator disposed in close proximity to said first scintillator;

a photomultiplier tube of said second scintillator;

a screen separating said first and second scintillators;

means for placing a sample of an analyzed substance placed between said first and second scintillators so that said sample is brought into immediate contact with said scintillators and said screen;

an adder having inputs and an output, said inputs being connected to said photomultiplier tubes;

a selector connected to said output of said adder; α and β outputs of said selector; and an element for recording pulses corresponding to α- and β-particles and β-α and α-α cascade pairs of delayed coincidences of RaC, ThC and AcA radionuclides, said element having inputs connected to said α and β outputs of said selector.

* * * * *